United States Patent
Anderson

(10) Patent No.: US 10,746,314 B2
(45) Date of Patent: Aug. 18, 2020

(54) POSITIONER APPARATUS FOR USE WITH FLUID VALVES

(71) Applicant: Fisher Controls International LLC, Marshalltown, IA (US)

(72) Inventor: Steven Clayton Anderson, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 125 days.

(21) Appl. No.: 16/135,927

(22) Filed: Sep. 19, 2018

(65) Prior Publication Data

US 2020/0088315 A1   Mar. 19, 2020

Related U.S. Application Data

(60) Provisional application No. 62/731,598, filed on Sep. 14, 2018.

(51) Int. Cl.
  *F16K 31/04*     (2006.01)
  *F16K 37/00*     (2006.01)

(52) U.S. Cl.
  CPC .......... *F16K 31/046* (2013.01); *F16K 37/005* (2013.01); *F16K 37/0041* (2013.01); *Y10T 137/7761* (2015.04)

(58) Field of Classification Search
  CPC .. F16K 31/046; F16K 37/0041; F16K 37/005; F15B 2211/30575; F15B 2211/327; F15B 2211/8752; F15B 2211/8757; F15B 20/008; Y10T 137/7761

USPC ...................... 251/129.04, 68, 73; 137/487.5
See application file for complete search history.

(56) References Cited

U.S. PATENT DOCUMENTS

| | | | | |
|---|---|---|---|---|
| 4,987,358 A * | 1/1991 | Branam | ................ | F16K 31/046 318/282 |
| 8,118,276 B2 * | 2/2012 | Sanders | ................ | G05B 19/39 251/129.04 |
| 2004/0237518 A1 * | 12/2004 | Fenny | .................... | B64C 13/42 60/403 |

(Continued)

FOREIGN PATENT DOCUMENTS

| DE | 102014211258 | 12/2015 |
|---|---|---|
| DE | 202018104833 | 10/2018 |

OTHER PUBLICATIONS

International Searching Authority, "International Search Report and Written Opinion," issued in connection with International Patent Application No. PCT/US2019/050799, dated Nov. 25, 2019, 11 pages.

*Primary Examiner* — John Bastianelli
(74) *Attorney, Agent, or Firm* — Hanley, Flight & Zimmerman, LLC

(57) ABSTRACT

Methods, apparatus, systems and articles of manufacture are disclosed for a positioner apparatus for use with fluid valves. An example apparatus includes a fluid valve, an actuator operatively coupled to the fluid valve, and a positioner fluidly coupled to the actuator to control a position of the fluid valve via a fluid provided from a fluid supply line, the positioner having first and second transducers configured to increase or decrease a pressure of the fluid in the actuator, the positioner to enable the first and second transducers to change the position of the fluid valve during a safety event.

18 Claims, 7 Drawing Sheets

(56) References Cited

U.S. PATENT DOCUMENTS

| | | | |
|---|---|---|---|
| 2009/0199703 A1* | 8/2009 | Hoffmann | F15B 11/028 91/361 |
| 2013/0009080 A1* | 1/2013 | Schrobenhauser | F15B 9/12 251/30.01 |
| 2014/0117263 A1 | 5/2014 | Valentin-Rumpel | |
| 2015/0109395 A1 | 4/2015 | Iwao et al. | |

* cited by examiner

POSITIONER APPARATUS FOR USE WITH FLUID VALVES

RELATED APPLICATION

This patent claims the benefit of and priority to the previously filed U.S. Provisional Patent Application Ser. No. 62/731,598, entitled "POSITIONER APPARATUS FOR USE WITH FLUID VALVES," filed Sep. 14, 2018. The subject matter of this application is incorporated herein by reference in its entirety.

FIELD OF THE DISCLOSURE

This disclosure relates generally to valves, and, more particularly, to a positioner apparatus for use with fluid valves.

BACKGROUND

The function of a positioner when used as a safety instrument (for example, when used as a safety instrument in a fluid valve in a process control system) is to facilitate the actuation of a final control device from a normal operating state to a safe state (e.g., a tripped state). In some example valves, the actuation of the final control device occurs in response to a setpoint signal going from high to low (e.g., deenergize to trip (DETT)). In other example valves, the actuation of the final control device occurs in response to the setpoint signal going from low to high (e.g., energize to trip (ETT)).

Safety systems in which valves fail or degrade (e.g., a component of the field device fails or degrades) may result in the inability of the device to achieve the safe state. Valve failure/degradation during operation can also create undesirable operating conditions of the safety instrumented system. The possibility of a failed valve creating undesirable operating conditions can be mitigated by implementing redundant safety instruments in the valve.

SUMMARY

An example positioner apparatus includes an actuation module to control an actuating fluid that is provided to a valve actuator, the actuation module having a first transducer to change one or more parameters of the fluid, and a trip circuit operatively interposed between the actuation module and the actuator to control the position of the fluid valve via the fluid, the trip circuit having a second transducer to change the one or more parameters of the fluid, the positioner to control the actuation module and the trip circuit to operate the fluid valve during a safety event.

An example apparatus includes a fluid valve, an actuator operatively coupled to the fluid valve, and a positioner fluidly coupled to the actuator to control a position of the fluid valve via a fluid provided from a fluid supply line, the positioner having first and second transducers configured to increase or decrease a pressure of the fluid in the actuator, the positioner to enable the first and second transducers to change the position of the fluid valve during a safety event.

An example method includes receiving a request to trip a fluid control valve via a valve positioner, the valve positioner having an actuation module and a trip circuit to control a fluid pressure in a valve actuator operatively coupled to the fluid valve, the trip circuit fluidly coupled between the actuation module and the actuator, and controlling the actuation module and the trip circuit to open or close the fluid valve in response to receiving the request.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
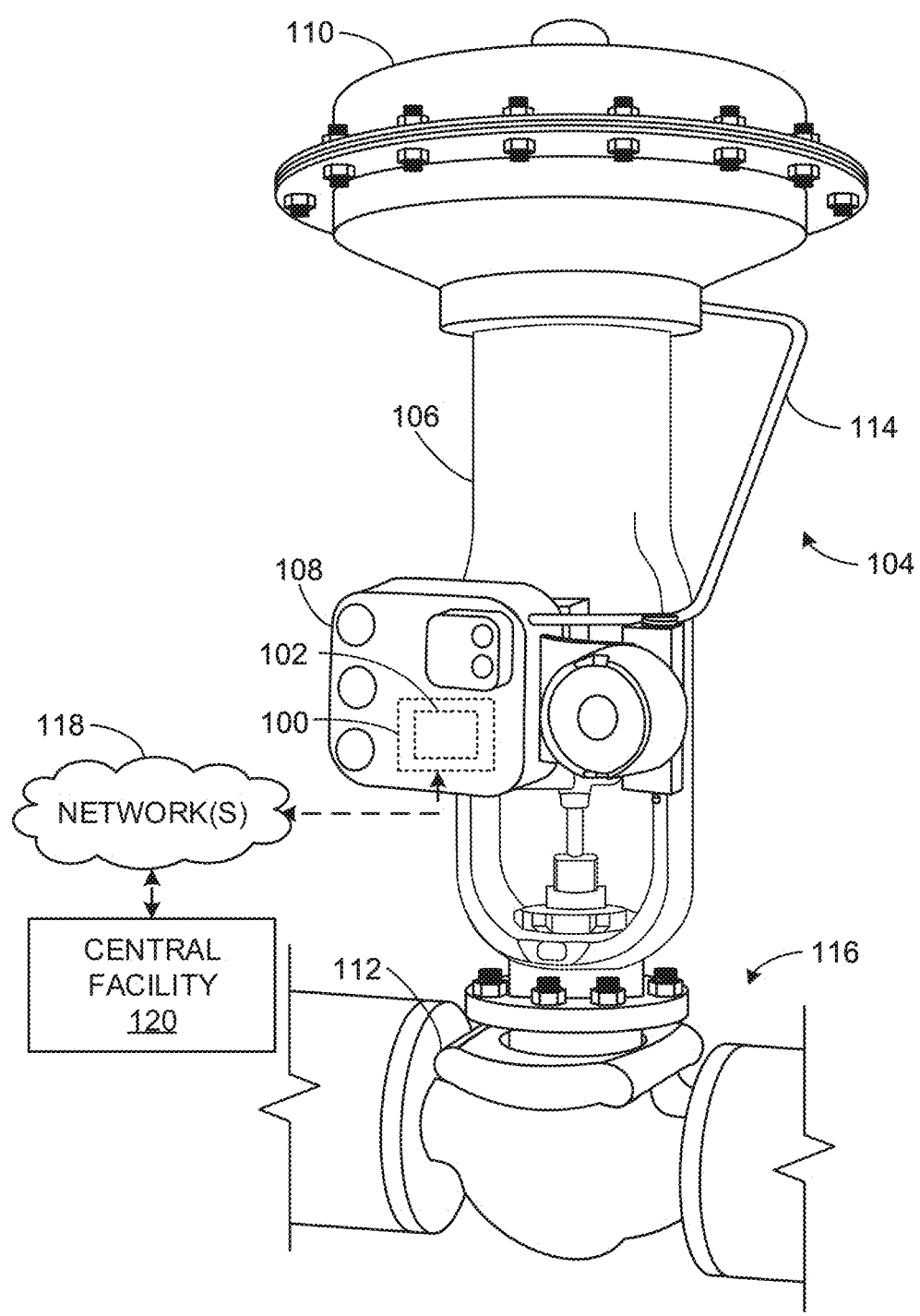
FIG. 1 is a schematic illustration of an example positioner included in a valve assembly in accordance with the teachings of this disclosure.

Positioners, when used as safety instruments (for example, when used as a safety instrument in a fluid valve in a process control system), facilitate the actuation of a control device from a normal operating state to a safe state (e.g., a tripped state). The actuation can occur, in some examples, in response to a modulation of a setpoint signal from high to low (e.g., deenergize to trip (DETT)). The actuation can occur, in yet other examples, in response to a modulation of the setpoint signal from low to high (e.g., energize to trip (ETT)). Further, as used herein, in DETT applications, venting the actuator corresponds to initialization of a safety function and, in ETT applications, charging of the actuator corresponds to initialization of the safety function.

Process control systems in which valves fail or degrade (e.g., a component of the field devices fails or degrades) during operation can experience increased periods of downtime. Valve failure/degradation during operation can also create undesirable operating conditions of the process control system. The possibility of a failed valve creating undesirable operating conditions can be mitigated by implementing redundant safety systems in the valve.

While the example disclosed herein are illustrated in conjunction with a positioner, the examples herein can be implemented with various other field devices and instruments, which refer to control devices such as, for example, actuators, actuator assemblies, actuator controllers, actuator positioners, sensors, transmitters, valve assemblies, etc. that may be used throughout a process control system to measure and/or control different aspects (e.g., other process control devices) of the process control system. A field device such as a valve (e.g., a valve assembly) may include both electrical and mechanical components. For example, the valve may include electrical components such as a digital valve positioner, a flow rate sensor, a pressure sensor, a travel sensor, a valve controller, etc. In another example, the valve may include mechanical components such as an actuator (e.g., a hydraulic actuator, a pneumatic actuator, etc.), a mechanical housing, a process connection, etc.

In examples disclosed herein, the positioner (or field device, instrument, etc.) is implemented with a trip module that includes one or more transducers. The trip module, in some examples, is fluidically and/or electronically coupled to multiple subsystems of the positioner.

For example, the trip module is fluidically coupled to a actuation module (e.g., a servo, a motor, a control element, etc.) additionally including one or more transducers (e.g., utilized to modulate pressure supplied to the actuator) and is electronically coupled to at least a trip input and a trip detection module. In some examples, the transducers may be implemented by a solenoid actuated valve (e.g., an electrically controlled solenoid actuated valve). The disclosed combination of fluidic coupling and electrical coupling of the trip module adds additional redundancy to the system.

In DETT applications, the positioner has the technical effect of providing redundancy to the venting functionality. For example, due to a logical one being applied to each of two vent transducers when a trip condition (e.g., a safety event) is detected and redundancy to the charge functionality due to two charge transducers being placed in series (e.g., fluidically coupled in series), thus aborting charge functionality due to failure (e.g., malfunction) in either of the charge transducers.

Alternatively, in ETT applications, the positioner has the technical effect of providing redundancy to the charging functionality. For example, due to a logical one being applied to each of two charge transducers when a trip condition (e.g., a safety event) is detected) and redundancy to the vent functionality due to two vent transducers being placed in series (e.g., fluidically coupled in series), thus aborting charge functionality due to failure (e.g., malfunction) in either of the vent transducers.

As will be discussed in greater detail below in accordance with the teachings of this disclosure, the positioner and/or trip module can have various configurations that may depend on a type of valve and/or characteristics associated with the process control environment in which the valve is disposed (e.g., whether the valve is utilized in a DETT application or an ETT application). In examples disclosed herein, these configurations can be changed or altered to optimize the ability of the trip module to accurately and robustly enact a safety function in response to failure and/or malfunction of a component included in the positioner.

Turning to FIG. 1, an example positioner 100 including an example trip module 102 (e.g., a trip circuit) disclosed herein operates in a process control environment 104 by obtaining valve position information for a valve assembly 106 (e.g., a fluid valve, a fluid control valve, etc.). A first example implementation of the positioner 100 and the trip module 102, utilized in a deenergize to trip (DETT) system, is further described in conjunction with FIG. 2, a second example implementation of the positioner 100 and the trip module 102, utilized in an energize to trip (EET) system, is further described in conjunction with FIG. 3, and a block diagram of a third example of the positioner 100 and the trip module 102 is further described in conjunction with FIG. 4.

In the illustrated example, the positioner 100 and the trip module 102 are housed in an enclosure 108 and coupled to the example actuated valve assembly 106 (e.g., a pneumatically actuated valve assembly) that includes at least an actuator 110 (e.g., a fluid actuator, a valve actuator, etc.) and a valve 112 (e.g., a butterfly valve, a gate valve, etc.).

However, other valve assemblies may additionally or alternatively be utilized, such as an electrically actuated valve assembly, a hydraulically actuated valve assembly, etc. In the illustrated example, the positioner 100 includes an electronic valve controller that measures one or more parameters of the actuator 110 and/or the valve 112 (e.g., the position of the valve 112) and/or controls the actuator 110 and/or the valve 112.

Additionally, the positioner 100 can measure one or more parameter(s) such as, for example, valve travel (e.g., a position of a valve), an actuator pressure, a drive signal, etc. The positioner 100 can control the actuator 110 and/or the valve 112 via a parameter such as, for example, a command signal or an input signal (e.g., a travel set point). The enclosure 108 for the positioner 100 includes a connection point for a pneumatic tube connection 114. The positioner 100, in such examples, can further enable pneumatic control of the actuator 110 via the pneumatic tube connection 114.

In the illustrated example, the valve assembly 106 is installed in a fluid process system 116 (e.g., a distribution piping system) of a plant environment or processing system. The fluid process system 116 may be located in an environment that may expose the positioner 100 to one or more difficult operating conditions (e.g., extreme vibration, a wide temperature range, etc.) and cause premature failure of one or more components of the positioner 100. For example, the positioner 100 may be installed downstream of a positive-displacement pump and subjected to extreme vibration. Different failure modes of the positioner 100 may occur due to the extreme vibration causing damage and/or degradation of the electrical components of the positioner 100.

In the illustrated example, the positioner 100 is coupled, via a network 118, to an example central facility 120. The network 118, in some examples, can include one or more data buses (e.g., HART (Highway Addressable Remote Transducer) communication network, Foundation Fieldbus, Profibus (Process Field Bus), etc.), one or more Local Area Networks (LANs), one or more wireless LANs, one or more cellular networks, one or more private networks, one or more public networks, etc. The central facility 120, communicatively coupled to the positioner 100 via the network 118, is capable of processing and/or storing one or more parameters generated by the positioner 100 (e.g., a position of the valve, a trip condition of the valve, a failure condition causing the trip conditions, etc.).

Figure 2:
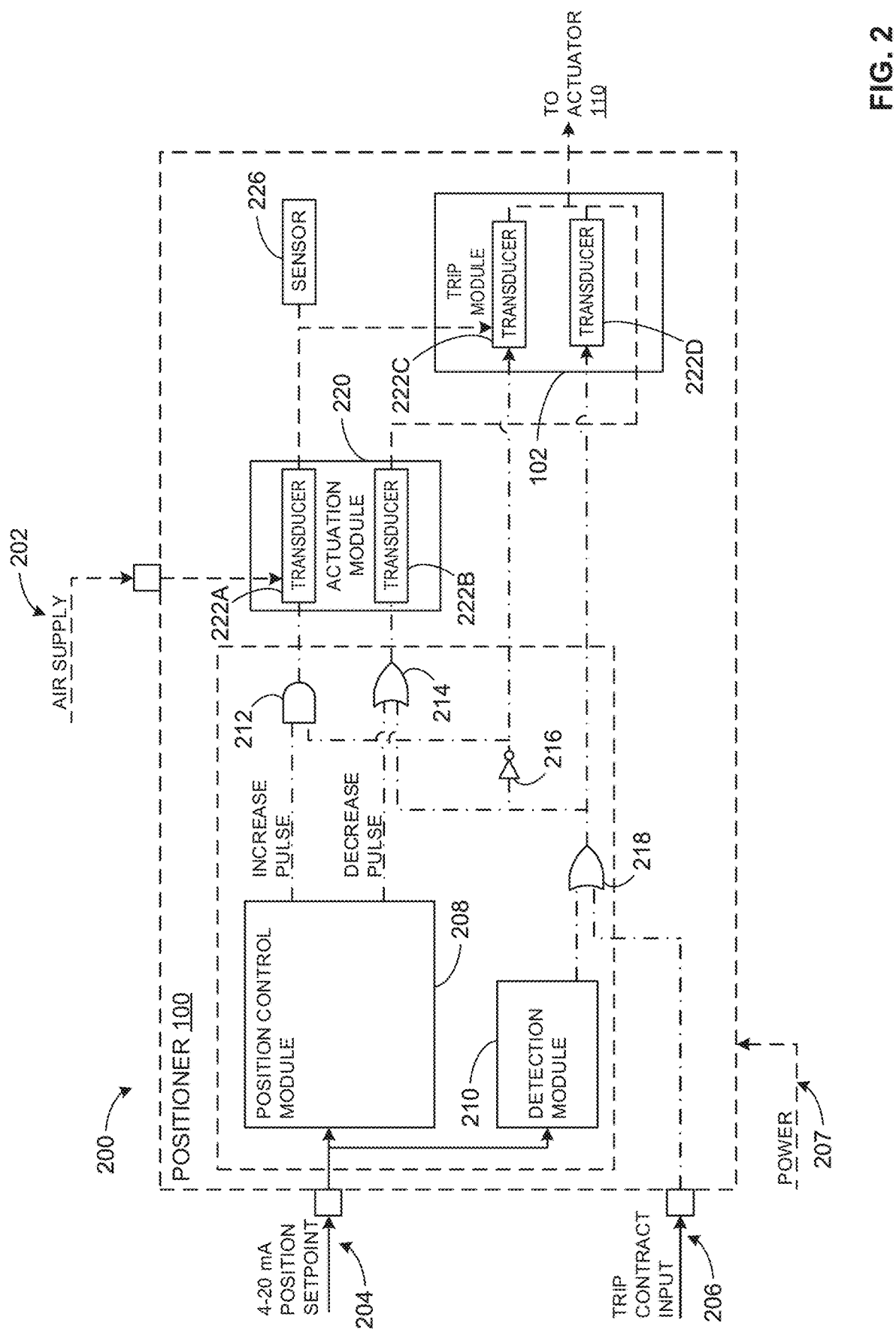
FIG. 2 is a schematic illustration of a first example implementation of the positioner of FIG. 1.

FIG. 2 is a first example implementation 200 of the example positioner 100 including the example trip module 102 of FIG. 1. The first example implementation 200 is configured for deenergize to trip (DETT) applications. In the illustrated example of FIG. 2, the first example implementation 200 of the positioner 100 further includes the trip module 102, an example air supply 202, an example position setpoint 204, an example trip input 206, an example power input 207, an example position control module 208, an example detection module 210, an example AND gate 212, an example OR gate 214, an example NOT gate 216, an example OR gate 218, an example actuation module 220, one or more example transducer(s) 222A, 222B, 222C, 222D, and an example sensor 226.

The air supply 202, fluidically coupled to the positioner 100, is capable of supplying the positioner 100 with either a constant or adjustable supply pressure (e.g., 10 psi, 30 psi, 80, psi, etc.) of a control fluid (e.g., an actuating fluid). In some examples, when the supply 202 is adjustable, the supply 202 can be adjusted by at least one of a human operator of the valve assembly 106 or a computational algorithm included in the positioner 100. While in the illustrated example the control fluid supplied by the supply 202 is air, any other control fluid (e.g., water, hydraulic fluid, oil, etc.) can be used.

The position setpoint 204 corresponds to a desired position set point of the valve assembly 106. In some examples such as the illustrated example of FIG. 2, the distributed set point is a 4-20 mA analog control signal, where 4 mA corresponds to a minimum position setpoint and 20 mA corresponds to a maximum position setpoint. In other examples, the position setpoint 204 can additionally or alternatively be a digital setpoint (e.g., a HART protocol signal, a Fieldbus signal, a Profibus signal, etc.).

The trip input 206 receives a signal indicating whether a trip condition (e.g., a safety function) is to be enacted by the valve assembly 106. In other examples, the signal at the trip input 206 is manually generated by an operator of the valve assembly 106 via a user input (e.g., a button press, switch toggle, etc.). In yet other examples, the signal at the trip input 206 is automatically generated by a component of the valve assembly 106 different than the positioner 100. Further, the signal distributed by the trip input 206, in some examples, is distributed as one of a binary one (e.g., trip condition to be enacted) or a binary zero (e.g., trip condition not to be enacted).

The example power line 207 may provide electrical power to one or more of the components of the positioner 100 with a supply voltage (e.g., 5 volts, 12 volts, etc.). For example, the power line 207 can supply electrical power to at least one of the position control module 208, the detection module 210, the actuation module 220, the sensor 226, and/or the trip module 102. In some examples, the power line 207 can also carry power line communication and can facilitate communication between one or more components of the valve assembly 106 and one or more components of the positioner 100. In some examples, the power line 207 includes two wires (e.g., a pair of wires) that include a ground and a power wire. Additionally or alternatively, the power line 207 can include three wires. In some examples, the example power line 207 does not power the positioner 100 and, instead, the 4-20 mA control signal of the position setpoint 204 powers the positioner 100.

The position control module 208, included in or otherwise implemented by the positioner 100, is capable of determining (e.g., controlling, regulating, etc.) a desired position for the valve assembly 106 based upon the position setpoint 204. In some examples, the position control module 208 is further to convert the position setpoint signal received (in some examples, the signal is an analog signal) into a digital pulse (e.g., where the duration and quantity of the pulses corresponds to a desired change in position of the valve) to be distributed to at least one of the transducers(s) 222A, 222B via the AND gate 212 and the OR gate 214.

The detection module 210, included in or otherwise implemented by the positioner 100, is capable of comparing the position setpoint 204 signal to a threshold. In some examples, in response to the signal received satisfying the threshold, the detection module 210 is to output a logical one. Conversely, in response to the signal received not satisfying the threshold, the detection module 210 is to output a logical zero. Further, in some examples, the detection module 210 is capable of latching the logical one value (e.g., retaining the logical one output regardless of input to the detection module 210).

Additionally, the positioner 100 includes multiple logic gates (e.g., devices that determine a logical output (e.g., a binary one, a binary zero, etc.) based on one or more logical inputs) including the AND gate 212, the OR gate 214, the NOT gate 216 and the OR gate 218.

The AND gate 212, for example, outputs a logical one signal when each of the input signals (two signals in the illustrated example of FIG. 2) are logical one signals. Alternatively, the AND gate 212 outputs a logical zero signal when one or more of the input signals are logical zero signals. Additionally, the OR gate(s) 214, 218, for example, output a logical one signal when one or more of the input signals (e.g., one of the two signals, both of the signals, etc. in the illustrated example of FIG. 2) are logical ones and outputs a logical zero when both of the input signals are logical zeros. Additionally, the NOT gate 216, for example, outputs a logical one when the input is a logical zero and, conversely, outputs a logical zero when the input is a logical one.

The actuation module 220, included in or otherwise implemented by the positioner 100, is capable of actuating a fluid flow (for example, a fluid flow from the air supply 202) based upon an input signal. In some examples, the actuation module 220 directly provides the actuated fluid flow to the actuator 110. However, in the redundant systems disclosed herein, the actuation module 220 is to provide the actuated fluid flow to the actuator 110 via the trip module 102.

The transducers(s) 222A, 222B, 222C, 222D, included in or otherwise implemented by the positioner 100, are capable of converting at least one of a digital signal (e.g., a binary signal, a logical signal, etc.) or an analog signal (e.g., an analog current, an analog voltage, etc.) into a pressure value. In some examples, the pressure values are further to control the position and/or safety functionality of the actuator 110 via different pressures that correspond to opening and/or closing of hardware including in one or more of the transducers(s) 222A, 222B, 222C, 222D.

The example sensor 226, included in or otherwise implemented by the positioner 100, is capable of determining a fluid pressure of the fluidic connection between one of the transducers included in the actuation module 220 (e.g., the transducers 222A, 222B) and one of the transducers included in the trip module 102 (e.g., the transducers 222C, 222D). In some examples, the output of the sensor 226 may be a second fluid pressure that is different from the input fluid pressure. Alternatively, the output of the sensor 226 may be one of an analog voltage or current. In each example, a calibration curve is determined for a comparison of the input fluid pressure to the output parameter of the sensor 226.

In an operational example of the first example implementation 200 of the positioner 100, the positioner 100 receives a supply pressure from the air supply 202, an analog signal (e.g., a 4-20 mA current signal) from the position setpoint 204, a logical zero or one from the trip input 206 and a power signal from the power line 207. The position control module 208 and the detection module 210 each receive the analog signal from the position setpoint 204.

Based upon the setpoint signal, the position control module 208 distributes at least one of an increase pulse signal or a decrease pulse signal to the AND gate 212 or the OR gate 214, respectively. Additionally based upon the setpoint signal, the detection module 210 outputs a logical one (and, in some examples, latches the logical one value) when the signal exceeds a threshold and outputs a logical zero when the signal does not exceed the threshold and further distributes the determined logical signal to the OR gate 218. Further, the OR gate 218 receives either a logical zero (e.g., no manual trip detected) or a logical one (e.g., a manual trip detected) from the trip input 206.

The OR gate 218, based upon logical signals received from the detection module 210 and the trip input 206, outputs a logical one to each of the OR gate 214, the NOT gate 216, and the transducer 222C when one or both signals received from the detection module 210 and the trip input 206 are logical ones. Conversely, the OR gate 218 outputs a logical zero to each of the OR gate 214, the NOT gate 216, and the transducer 222C when each of the signals received from the detection module 210 and the trip input 206 are logical zeros.

The NOT gate 216, based on the logical signal received from the OR gate 218, outputs a logical one in response to receiving a logical one and outputs a logical zero in response to receiving a logical zero, effectively flipping the signal received from the OR gate 218. Further, the NOT gate 216 distributes the output signal to the AND gate 212 and the transducer 222C.

The AND gate 212, based on the logical signals received from the position control module 208 (e.g., the increase pulse signal) and the NOT gate 216, outputs a logical one to the transducer 222A when each of the signals is a logical one and outputs a logical zero to the transducer 222A when one or more of the signals is a logical zero. The transducer 222A, coupled to the supply 202, converts the signal into a pressure distributed to each of the sensor 226 and the transducer 222C, the pressure increasing (e.g., charging) when the output of the AND gate 212 is a logical one and not increasing (e.g., no charging) when the output of the AND gate 212 is a logical zero.

The OR gate 214, based on the logical signal received from the position control module 208 (e.g., the decrease pulse signal) and the OR gate 218, outputs a logical one to the transducer 222B when one or more of the signals is a logical one and outputs a logical zero to the transducer 222B when both of the signals are logical zeros. The transducer 222B converts the signal into a pressure distributed to the actuator 110, the pressure decreasing (e.g., venting) when the output of the OR gate 214 is a logical one and not decreasing (e.g., not venting) when the output of the OR gate 214 is a logical zero.

The transducer 222C, coupled to each of the NOT gate 216, one of the transducer 222A or the sensor 226, and the transducer 222C, outputs a pressure to the actuator 110. In some examples, the pressure increases (e.g., charges) when the output of the NOT gate 216 is a logical one and the pressure received from one of the transducer 222A and/or the sensor 226 shows charging functionality at the transducer 222A. Conversely, the output pressure does not increase (e.g., no charging) when the output of the NOT gate 216 is a logical zero or the pressure received from one of the sensor 226 or the transducer 222A does not show charging functionality. Thus, the transducer 222A and the transducer 222C are redundantly in series with one another.

The transducer 222D, coupled to each of the OR gate 218 and the transducer 222D, exhausts pressure from the actuator 110. In some examples, the pressure decreases (e.g., vents) when the output of the OR gate 218 is a logical one and the output pressure does not decrease (e.g., no venting) when the output of the OR gate 218 is a logical zero. Thus, the transducer 222D provides venting redundancy along with the transducer 222B.

Thus, the first example implementation 200 of the positioner 100 has the technical effect of providing redundancy to the venting functionality due to a logical one being applied to each of the transducers 222B, 222D (e.g., the vent transducers) when a trip condition (e.g., a safety event) is detected and redundancy to the charge functionality due to the transducers 222A, 222C being placed in series (e.g., fluidically coupled in series), thus aborting charge functionality due to failure (e.g., malfunction) in either of the transducers 222A, 222C.

Figure 3:
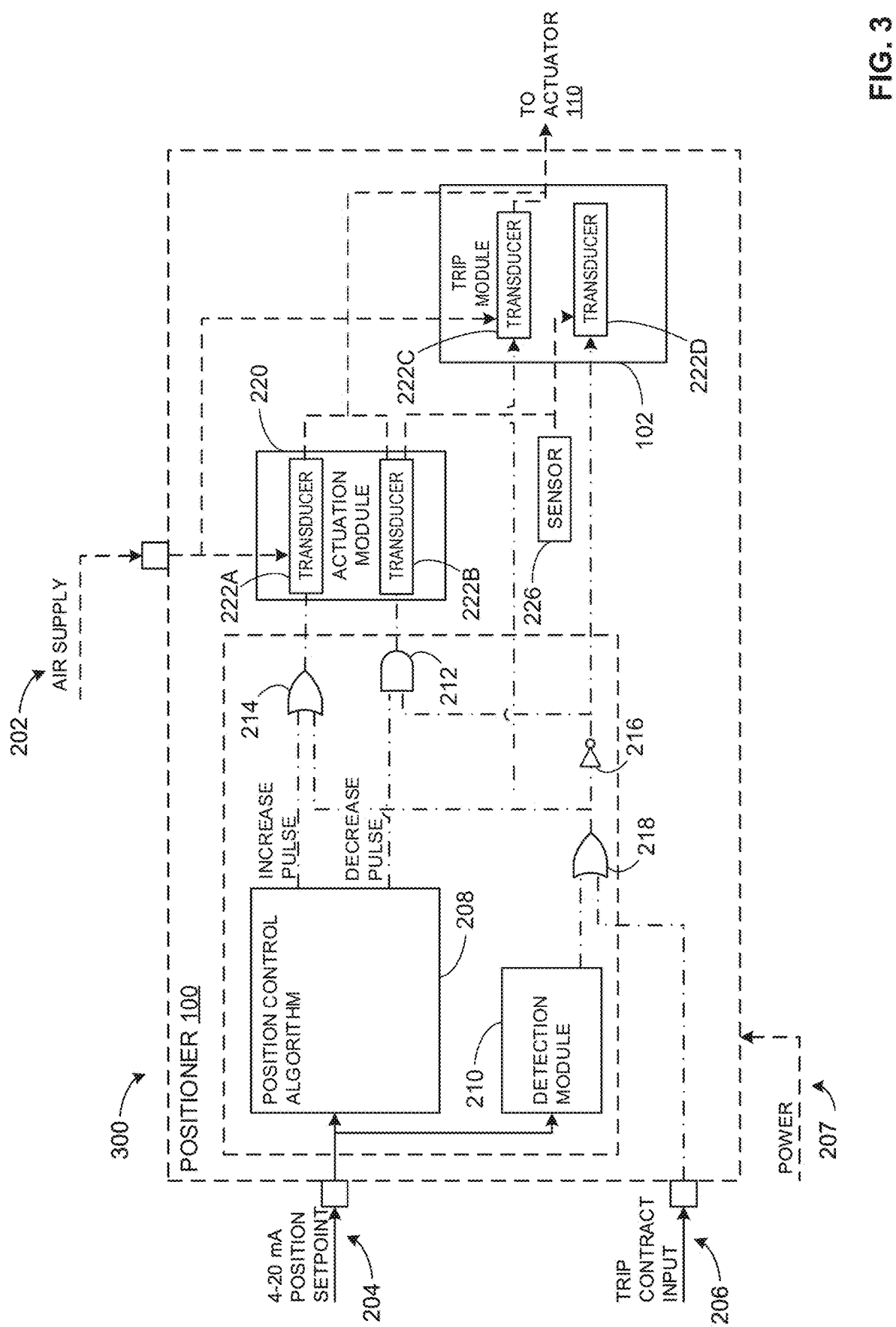
FIG. 3 is a schematic illustration of a second example implementation of the positioner of FIG. 1.

FIG. 3 is a second example implementation 300 of the example positioner 100 including the trip module 102 of FIG. 1, wherein the second example implementation 300 is configured for energize to trip (ETT) applications. The second example implementation 300 of the positioner 100 further includes the trip module 102, the air supply 202, the position setpoint 204, the trip input 206, the power line 207, the position control module 208, the trip detect module 210, the AND gate 212, the OR gates 214, the NOT gate 216, the example OR gate 218, the actuation module 220, the transducers 222A, 222B, 222C, 222D, and the sensor 226, each of which is described in conjunction with the first example implementation 200 of the positioner 100.

However, unlike the first example implementation 200 of the positioner 100 (utilized for DETT applications), the second example implementation 300 of the positioner 100 is utilized for ETT applications. For example, operational differences include the OR gate 214 being coupled to the transducer 222A (coupled to the transducer 222B in the first example implementation 200) and the AND gate 212 being coupled to the transducer 222B (coupled to the transducer 222A in the first example implementation 200). Additionally, the sensor 226 is fluidically coupled the transducer 224B and the transducer 222D (between the transducer 222A and the transducer 222C in the first example implementation 200) and the air supply 202 is coupled to each of the transducer 222A and the transducer 222C (only coupled to the transducer 222A in the first example implementation 200). Finally, each of the transducers 222A, 222B is directly coupled to the actuator 110.

Thus, the second example implementation 300 of the positioner 100 has the technical effect of providing redundancy to the charging functionality due to a logical one being applied to each of the transducers 222A, 222C (e.g., the charge transducers) when a trip condition (e.g., a safety event) is detected and redundancy to the vent functionality due to the transducers 222B, 222D (e.g., the vent transducers) being placed in series (e.g., fluidically coupled in series), thus aborting vent functionality due to failure (e.g., malfunction) in either of the transducers 222B, 222D.

Figure 4:
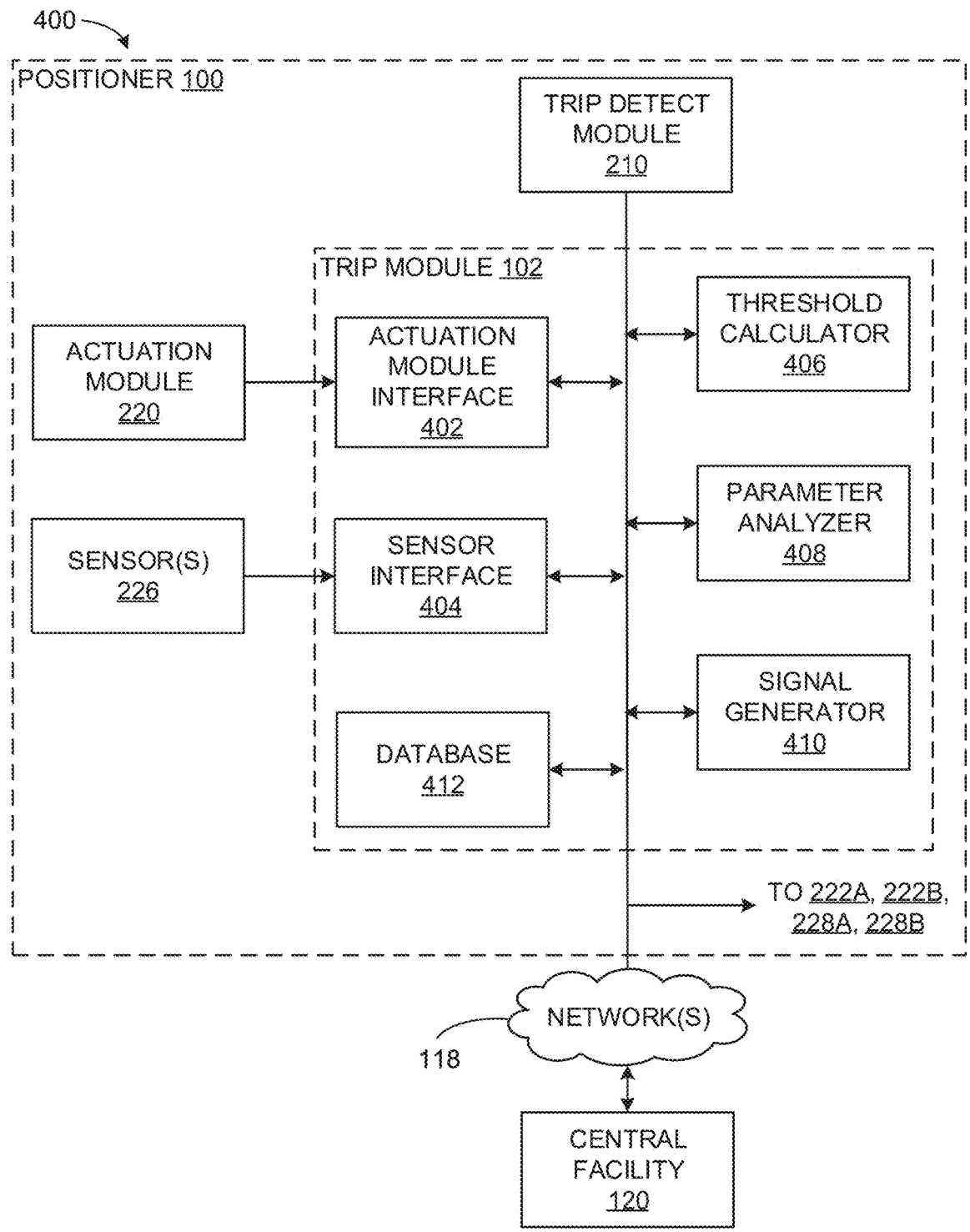
FIG. 4 is a block diagram of a third example implementation of the positioner of FIG. 1.

FIG. 4 is a block diagram of a third example implementation 400 of the positioner 100. The third example implementation 400 of the positioner 100 can, in some examples, include the trip detection module 210, the actuation module 220, the sensor(s) 226, and the trip module 102, which can in some examples further include an example actuation module interface 402, an example sensor interface 404, an example threshold calculator 406, an example parameter analyzer 408, an example signal generator 410, and an example database 412.

The actuation module interface 402, included in or otherwise implemented by the trip module 102, is capable of receiving a signal from the actuation module 220 included in the positioner 100. In some examples, the actuation module interface 402 is further to distribute the received signal to at least one of the threshold calculator 406, the parameter analyzer 408, and/or the database 412.

The sensor interface 404, included in or otherwise implemented by the trip module 102, is capable of receiving a signal from the sensor(s) 226 included in the positioner 100. In some examples, the sensor interface 404 is further to distribute the received signal to at least one of the threshold calculator 406, the parameter analyzer 408, and/or the database 412.

In some examples, the actuation module interface 402 and/or the sensor interface 404 can calculate a pressure parameter based on an unprocessed voltage value received from the actuation module 220 and/or the sensor 226, respectively, and a calibration curve that correlates the unprocessed analog voltage value to a valve pressure (e.g., 10 psi, 30 psi, etc.). Additionally or alternatively, the actuation module interface 402 and/or the sensor interface 404 can calculate a pressure parameter based on an unprocessed digital electrical signal (e.g., a hex value based on a communication protocol data packet) and a lookup table that correlates the unprocessed digital electrical signal to a valve pressure (e.g., 10 psi, 30 psi, etc.).

The threshold calculator 406, included in or otherwise implemented by the trip module 102, can determine one or more pressure thresholds for the pressure of the fluid between the actuation module 220 and the trip module 102. In some examples, the threshold calculator 406 can further determine whether satisfaction of the threshold includes the pressure exceeding the threshold or includes the pressure being less than the threshold. In some examples, the threshold(s) of the pressure between the actuation module 220 and the trip module 102 can be determined automatically by a processor. Additionally or alternatively, the threshold(s) of the pressure between the actuation module 220 and the trip module 102 can be determined by a user/operator.

The parameter analyzer 408, included in or otherwise implemented by the positioner 100, is capable of receiving one or more signals, the one or more signals including at least one of a pressure output from the actuation module 220 as retrieved by at least one of the actuation module interface 402 and/or the sensor interface 404, a pressure threshold as received by the threshold calculator 406, and/or a manual trip input as received from the detection module 210.

Additionally, the parameter analyzer 408 can, in some examples, facilitate comparisons between one or more pairs of received pressure parameters. For example, the parameter analyzer 408 can compare the pressure between the actuation module 220 and the trip module 102 received from one of the actuation module interface 402 and the sensor interface 404, and the threshold pressure as determined by the threshold calculator 406.

In some examples, the parameter analyzer 408 can include an electrical circuit, where the electrical circuit is to sum and/or subtract received signals corresponding to pressure parameters to facilitate the comparison (e.g., determine the deviation) between the parameters. Additionally or alternatively, the parameter analyzer 408 can include computer implemented hardware and/or software capable of determining deviations between received parameters.

In response to completing one or more comparisons (e.g., calculating one or more deviations), the parameter analyzer 408 is further to determine whether one or more components of the actuation module 220 are malfunctioning (e.g., has failed). In some examples, failure of one or more components of the actuation module 220 corresponds to a safety event. In such examples, it may be desirable for the positioner 100 to activate a safety state (e.g., a tripped state) of the actuator 110 of FIG. 1. In response to completing one or more comparisons and determining an operational state of one or more components of the actuation module 220, the parameter analyzer 408 is further to distribute at least one of the results of the comparison and/or the operational state of the one or more components to the signal generator 410.

The signal generator 410, included in or otherwise implemented by the positioner 100, is capable of providing control signals to one or more of the transducers(s) 222A, 222B, 222C, 222D based upon the comparisons completed by the parameter analyzer 408. In some examples, the control signals can be at least one of a digital voltage signal, a discrete voltage signal, an analog voltage signal, and/or an analog current signal. In some examples, providing control signals to one or more of the transducers(s) 222A, 222B, 222C, 222D can include control signals that are to open one or more of the transducers(s) 222A, 222B, 222C, 222D and/or close one or more of the transducers(s) 222A, 222B, 222C, 222D. Further, in such examples, the opening and/or closing of the one or more transducers(s) 222A, 222B, 222C, 222D can facilitate at least one of positional control of the actuator 110 of FIG. 1 and/or the application of a safety state to the actuator 110 of FIG. 1. Additionally or alternatively, the signal generator 410 can generate a notification of one or more failure modes of one or more components included in the process control environment 104. In such examples, the notification can be distributed to the central facility 120 via the network 118 for display (e.g., for a user and/or operator of the process control environment 104).

The example database 412, included in or otherwise implemented by the trip module 102, is capable of storing pressure values for a fluid between the actuation module 220 and the trip module 102, pressure threshold values as calculated by the threshold calculator 406, instances of manual activations of the trip state received from the detection module 210, one or more comparisons as completed by the parameter analyzer 408, one or more safety events and/or corresponding activations of a safety state as determined by the parameter analyzer 408 and initiated by the signal generator 410, among others.

The database 412 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 412 can additionally or alternatively be implemented by one or more double data rate (DDR) memories, such as DDR, DDR2, DDR3, mobile DDR (mDDR), etc. The database 412 can additionally or alternatively be implemented by one or more mass storage devices such as hard disk drive(s), compact disk drive(s), digital versatile disk drive(s), etc. While in the illustrated example the database 412 is illustrated as a single database, the database 412 can be implemented by any number and/or type(s) of databases. Further, the database 412 can be located in the trip module 102 or at a central location outside of the trip module 102 (e.g., the central facility 120 of FIG. 1). Furthermore, the data stored in the database 412 can be in any data format such as, for example, binary data, comma delimited data, tab delimited data, structured query language (SQL) structures, etc.

While an example manner of implementing the trip module 102 of FIG. 1 is illustrated in FIG. 4, one or more of the elements, processes and/or devices illustrated in FIG. 4 can be combined, divided, re-arranged, omitted, eliminated and/or implemented in any other way. Further, the example actuation module interface 402, the example sensor interface 404, the example threshold calculator 408, the example parameter analyzer 408, the example signal generator 410, and the example database 412 and/or, more generally, the example trip module 102 of FIG. 4 can be implemented by hardware, software, firmware and/or any combination of hardware, software and/or firmware. Thus, for example, any of the example actuation module interface 402, the example sensor interface 404, the example threshold calculator 406, the example parameter analyzer 408, the example signal generator 410, and the example database 412 and/or, more generally, the example trip module 102 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example actuation module interface 402, the example sensor interface 404, the example threshold calculator 406, the example parameter analyzer 408, the example signal generator 410, and/or the example database 412 is/are hereby expressly defined to include a non-transitory computer readable storage device or storage disk such as a memory, a digital versatile disk (DVD), a compact disk (CD), a Blu-ray disk, etc. including the software and/or firmware. Further still, the example trip module 102 of FIG. 4 can include one or more elements, processes and/or devices in addition to, or instead of, those illustrated in FIG. 4, and/or can include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
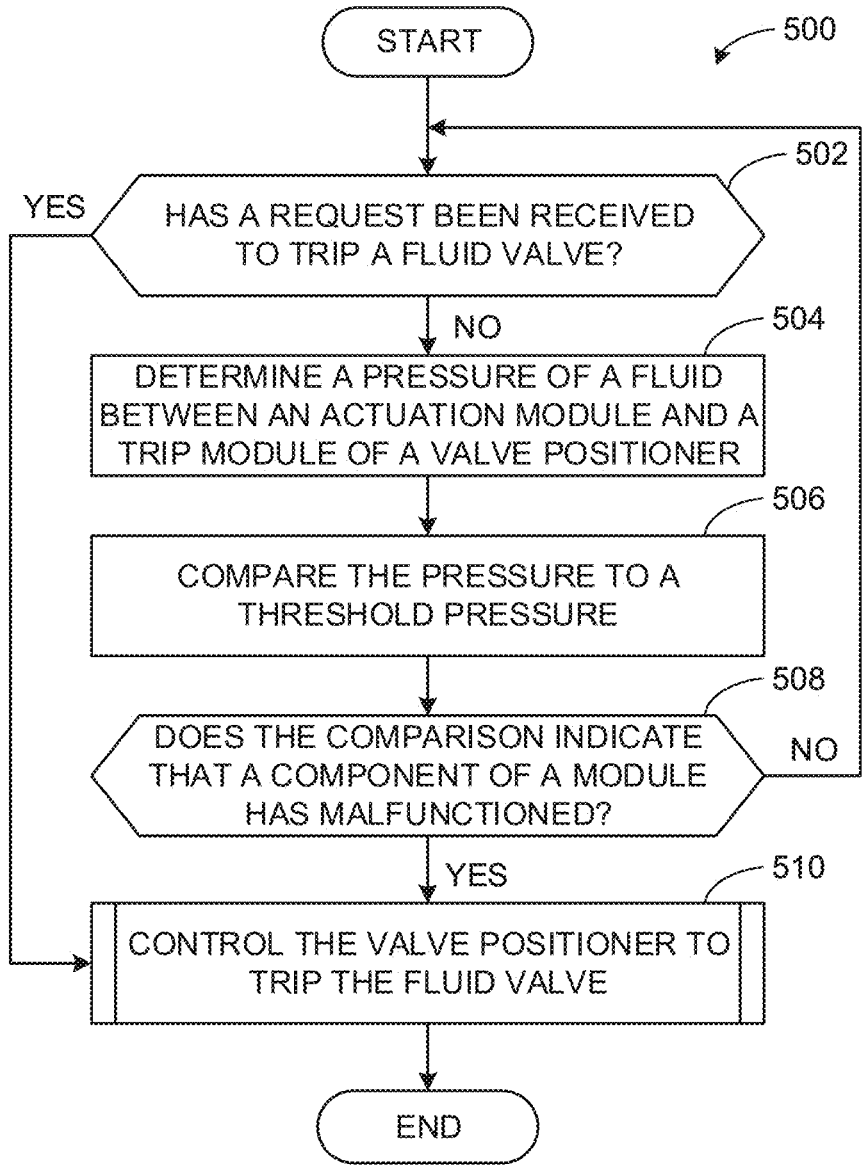
FIGS. 5-6 are flowcharts representative of example methods that can be performed using the example positioner of FIGS. 1 and 4.
Figure 6:
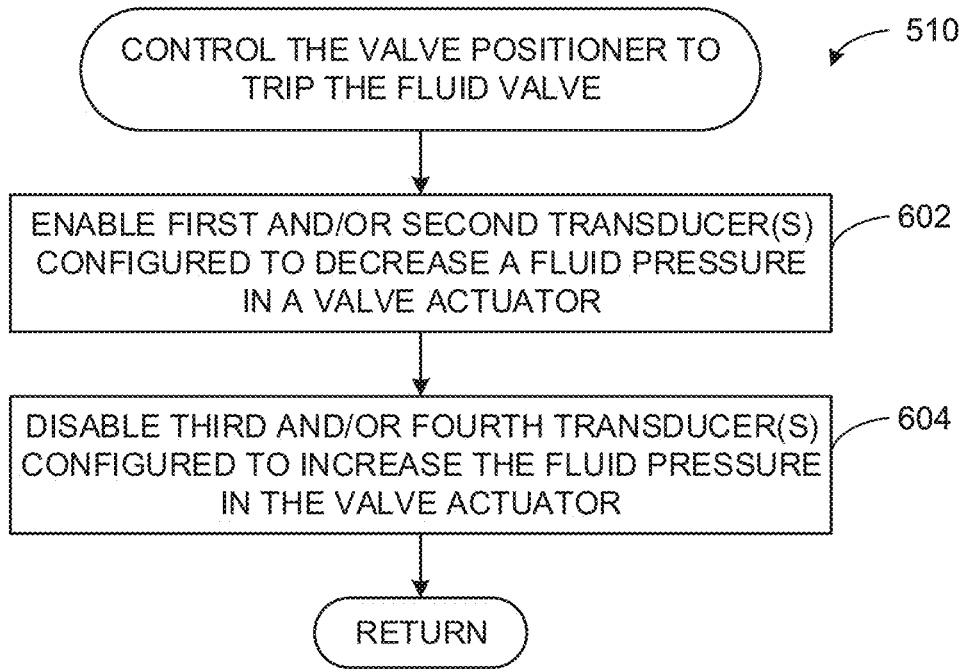

Flowcharts representative of example hardware logic, machine readable instructions, hardware implemented state machines, and/or any combination thereof for implementing the trip module 102 of FIG. 1 is shown in FIGS. 5-6. The machine readable instructions can be an executable program or portion of an executable program for execution by a computer processor such as the processor 712 shown in the example processor platform 700 discussed below in connection with FIG. 7. The program can be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 5-6, many other methods of implementing the example trip module 102 can alternatively be used. For example, the order of execution of the blocks can be changed, and/or some of the blocks described can be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5-6 can be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

An example method 500 of FIG. 5 for tripping the actuator 110 of the example valve assembly 106 of FIG. 1 during a safety event begins execution at block 502. At block 502, the trip module 102 (e.g., a trip circuit) determines whether a trip request was received from the example detection module 210 of FIG. 4. In response to having received a request to trip the actuator 110 of the valve assembly 106, processing proceeds to 510. Conversely, in response to having received no request to trip the actuator 110 of the valve assembly 106, processing proceeds to block 504.

At block 504, the sensor interface 404 included in the trip module 102 receives a pressure between the actuation module 220 and the trip module 102 determined by the sensor 226, each included in the positioner 100. In some examples, the sensor interface 404 is further to process the signal received from the sensor 226 into a signal (e.g., a digital voltage, an analog voltage, a current, a data packet, etc.) readable by the remaining components of the trip module 102.

Additionally or alternatively, in an implementation of the positioner 100 not including the sensor 226, the actuation module interface 402 included in the trip module 102 receives a pressure directly from the actuation module 220 and processes the pressure signal into a signal readable by the remaining components of the trip module 102 (e.g., a digital voltage, an analog voltage, a current, a data packet, etc.).

At block 506, the parameter analyzer 408 compares the pressure of the fluid between the actuation module 220 and the trip module 102, as received by one of the actuation module interface 402 or the sensor interface 404, to a threshold pressure as calculated by the threshold calculator 406. In response to completing the calculations required by the comparison, processing proceeds to block 508.

At block 508, the parameter analyzer determines whether one or more components of the actuation module 220 is malfunctioning (e.g., has failed) based upon the comparison of the pressure to the threshold completed at block 506. In some examples, it can be determined that a component has failed when the pressure exceeds the threshold. Alternatively, in other examples, it may be determined that a component has failed when the pressure does not exceed the threshold. In each example, in response to determining that one or more components of the actuation module 220 is(are) malfunctioning (e.g., one or more components have failed), processing transfers to block 510. Alternatively, in response to determining that all components of the actuation module 220 are functioning properly, processing returns to block 502.

At block 510, described further in conjunction with FIG. 6, the signal generator 410 generates a signal to control one or more of the transducer(s) 222A, 222B, 222C, 222D to trip the valve assembly 106 via the actuator 110. In response to completion of block 510, the example method 500 of FIG. 5 ends.

An example method that can be executed to control the valve positioner to trip the fluid valve (FIG. 5, block 510) is illustrated in FIG. 6. With reference to the preceding figures and associated descriptions, the example method of FIG. 6 begins execution at block 602 at which the signal generator 410 commands enablement of at least one of the transducer 222B and the transducer 222D, each of which is configured to decrease a pressure distributed to the actuator 110. In some examples, commanding enablement further includes distributing a high signal (e.g., a binary one, a supply voltage, etc.) to at least one of the transducer 222B, 222D.

At block 604, the signal generator 410 commands disablement of at least one of the transducer 222A and the transducer 222C, each of which is configured to increase a pressure distributed to the actuator 110. In some examples, commanding enablement further includes distributing a low signal (e.g., a binary zero, a ground voltage, etc.) to at least one of the transducer 222A, 222C.

Thus, via the enabling of at least the transducer 222B and the transducer 222D, each configured to decrease a fluid pressure distributed to the actuator 110 (e.g., the fluid actuator), and the disabling of at least the transducer 222A and the transducer 222C, each configured to increase pressure distributed to the actuator 110, the example method 510 provides redundant tripping of the valve assembly 106 of FIG. 1 in response to determining a component has malfunctioned (e.g., a safety event has occurred). In response to completion of block 604, the example method 510 of FIG. 6 ends and processing returns to the end of the example method 500 of FIG. 5.

Figure 7:
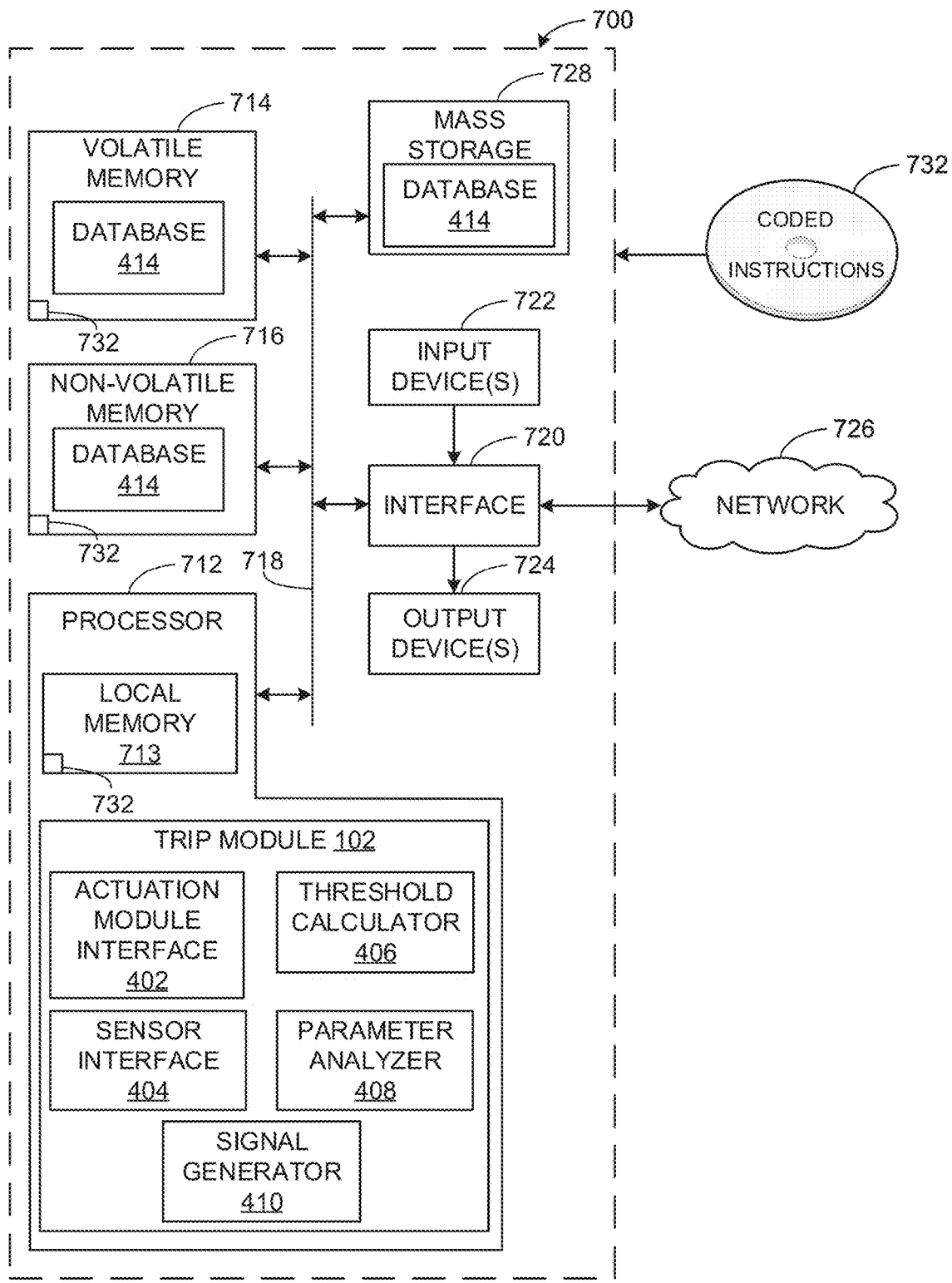
FIG. 7 is a block diagram of an example processing platform structured to execute machine readable instructions to implement the methods of FIGS. 5-6 and the example positioner of FIGS. 1 and 4.

FIG. 7 is a block diagram of an example processor platform 700 structured to execute the instructions of FIGS. 5-6 to implement the trip module 102 of FIG. 4. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example actuation module interface 402, the example sensor interface 404, the example threshold calculator 406, the example parameter analyzer 408, the example signal generator 410, and the example database 412.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 can be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 5-7 can be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that are to provide redundant systems in a valve assembly via a positioner of the valve assembly to improve the robustness of the assembly against failures that could impair the continuous operation of a process control system. Process control systems in which components fail during operation can experience increased periods of downtime, which leads to loss of revenue. Additionally, component failure during operation can also create hazardous operating conditions if the failed component provides erroneous or inaccurate data to the process control system. As such, providing redundant systems in valve assemblies is crucial to the successful operation of process control systems.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A positioner for a fluid valve, the positioner comprising:
   an actuation module to control a fluid provided to an actuator operatively coupled to the fluid valve, the actuation module having a first transducer to change a pressure of the fluid; and
   a trip circuit operatively interposed between the actuation module and the actuator to control the position of the fluid valve via the fluid, the trip circuit having a second transducer to change the pressure of the fluid, the positioner to control the actuation module and the trip circuit to operate the fluid valve during a safety event.

2. The positioner of claim 1, wherein a portion of the actuation module and a portion of the trip circuit are fluidly coupled in series with the actuator.

3. The positioner of claim 2, wherein the second transducer receives the fluid from the first transducer.

4. The positioner of claim 3, further including third and fourth transducers operatively coupled to the actuation module and trip circuit to change the pressure of the fluid, the first and second transducers configured to one of increase or decrease the pressure of the fluid, the third and fourth transducers configured to the other one of increase or decrease the pressure of the fluid.

5. The positioner of claim 4, wherein the valve positioner enables the first and second transducers while disabling the third and fourth transducers.

6. The positioner of claim 1, wherein the positioner is to control the trip circuit in response to user input provided to the positioner.

7. The positioner of claim 1, further including a sensor operatively coupled to the actuation module and the trip circuit to measure the pressure of the fluid, wherein the positioner is to detect failure of the actuation module based on the pressure of the fluid and, in response, control the trip circuit.

8. The positioner of claim 1, further including a housing, the actuation module and the trip circuit disposed in the housing.

9. The positioner of claim 1, wherein the positioner is to receive a pair of wires for providing power and communication to the actuation module and the trip circuit.

10. An apparatus, comprising:
    a fluid valve;
    an actuator operatively coupled to the fluid valve; and
    a positioner fluidly coupled to the actuator to control a position of the fluid valve via a fluid provided from a fluid supply line, the positioner including:
       an actuation module to control the fluid provided to the actuator, the actuation module having a first transducer to change a pressure of the fluid; and
       a trip circuit operatively interposed between the actuation module and the actuator to control the position of the fluid valve via the fluid, the trip circuit having a second transducer to change the pressure of the fluid, the positioner to control the actuation module and the trip circuit to operate the fluid valve during a safety event.

11. The apparatus of claim 10, wherein a portion of the actuation module and a portion of the trip circuit are fluidly coupled in series with the actuator.

12. The apparatus of claim 11, wherein the second transducer receives the fluid from the first transducer.

13. The apparatus of claim 12, wherein the positioner further includes third and fourth transducers operatively coupled to the actuation module and trip circuit to change the pressure of the fluid, the first and second transducers configured to one of increase or decrease the pressure of the fluid, the third and fourth transducers configured to the other one of increase or decrease the pressure of the fluid.

14. The apparatus of claim 13, wherein the positioner enables the first and second transducers while disabling the third and fourth transducers.

15. The apparatus of claim 10, wherein the positioner is to control the trip circuit in response to user input provided to the positioner.

16. The apparatus of claim 10, wherein the positioner further includes a sensor operatively coupled to the actuation module and the trip circuit to measure the pressure of the fluid, and wherein the positioner is to detect failure of the actuation module based on the pressure of the fluid and, in response, control the trip circuit.

17. The apparatus of claim 10, wherein the positioner further includes a housing, and wherein the actuation module and the trip circuit are disposed in the housing.

18. The apparatus of claim 10, wherein the positioner is to receive a pair of wires for providing power and communication to the actuation module and the trip circuit.

* * * * *